United States Patent [19]

Bräkelmann

[11] Patent Number: 4,856,551
[45] Date of Patent: Aug. 15, 1989

[54] DOUBLE SEAT VALVE WITH TWO VALVE DISKS

[75] Inventor: Wolfgang Bräkelmann, Unna-Uelzen, Fed. Rep. of Germany

[73] Assignee: Holstein und Kappert GmbH, Dortmund, Fed. Rep. of Germany

[21] Appl. No.: 554,050

[22] Filed: Nov. 21, 1983

[30] Foreign Application Priority Data

Nov. 20, 1982 [DE] Fed. Rep. of Germany ....... 3242947

[51] Int. Cl.[4] ........................... F16K 11/20; B08B 9/02
[52] U.S. Cl. ................................. 137/312; 134/166 C; 137/240; 137/614.17; 137/614.18; 137/614.19; 137/637.2; 251/332
[58] Field of Search ................... 137/240, 312, 614.17, 137/614.18, 637.2, 614.19; 134/166 C; 251/332, 333

[56] References Cited

U.S. PATENT DOCUMENTS

| | | | |
|---|---|---|---|
| 4,304,251 | 12/1981 | Schädel et al. ................ | 137/614.17 |
| 4,360,039 | 11/1982 | Jeppsson ........................ | 137/614.17 |
| 4,368,753 | 1/1983 | Bräkelmann et al. ............... | 137/315 |
| 4,373,545 | 2/1983 | Knappe ............................ | 137/240 |

FOREIGN PATENT DOCUMENTS

2248986 4/1974 Fed. Rep. of Germany ...... 137/312

Primary Examiner—George L. Walton
Attorney, Agent, or Firm—Toren, McGeady and Stanger

[57] ABSTRACT

A double seat valve includes a housing with a pair of valve disks independently movable within the housing between a closed position and an open position. Further, the valve disks can also be moved as a unit. A hollow leakage space is located between the valve disks. Leakage can be conveyed from the space to the exterior of the housing. Each valve disk has a separate valve seat and a cylindrically shaped wall surface extends between the valve seats and defines the radially outer boundary of the leakage space. A seal mounted in the first valve disk contacts the first valve seat in the closed position and moves in sealing contact with the cylindrically shaped wall surface as the first valve disk moves from the closed position toward the open position so that leakage losses from the valve are avoided.

7 Claims, 2 Drawing Sheets

DOUBLE SEAT VALVE WITH TWO VALVE DISKS

SUMMARY OF THE INVENTION

The present invention is directed to a double seat valve containing two valve disks which can be moved between a closed position and an open position independently of one another and/or jointly with one another. A hollow leakage space is provided between the two valve disks and a leakage passageway extends from the space to the exterior of the valve housing.

A leakage chamber located between double seal valve disks has an outwardly directed leakage passageway for directing leakage liquid which occurs if there is damage to the valve or to a valve seat. The leakage flows through the passageway to the exterior of the valve and provides an indication of the condition of the valve and also avoids any pressure build-up between the valve disks which could lead to a lifting of a valve disk. Such a hollow leakage chamber or space located between the two valve disks has the disadvantage that during shifting of the valve disks, the product flowing through the housing can leak out until the first valve disk contacts the corresponding second valve disk. In particular when frequent movements of the valve disks are required, considerable product losses can occur causing substantial losses, particularly with high-grade liquids such as are processed in the food industry.

To avoid this disadvantage, it has been proposed in German Offenlegungsschrift No. 22 48 986, among others, to provide an additional shoulder or projection on each valve member so that the shoulder or projection forms an annular gap between the liquid discharge opening of the valve and the housing surface so that the gap affords a throttling action. This throttling action prevents the liquid present ahead of the seat from flowing out in sudden bursts and it keeps the leakage losses, which are unavoidable during movement of the valve members, within certain limits. It is impossible, however, to eliminate completely these rather considerable losses with a valve of the known type.

Therefore, in a valve with valve disks of different diameters, it is the primary object of the invention to afford a tight closure of the valve spaces relative to the leakage space even when the valve disks are being moved between the open and closed positions. In accordance with the present invention, it is possible to dispense with the use of the known throttling gaps while retaining the reliable construction of valve disks with different diameters with the smaller valve disks located above the larger one or vice versa. In particular, a solution is provided for preventing leakage in such valves without reverting to the use of a slide valve arrangement.

In accordance with the present invention, a double seat valve of the type mentioned above, has a cylindrically shaped chamber forming the hollow leakage space between the valve seats. A cylindrical wall surface forms the radially outer boundary of the hollow space. A seal member, mounted in the first valve disk, provides a seal with the valve seat for the first valve disk in the closed position and also provides a seal with the cylindrical wall surface as the first valve disk is moved from the closed position toward the second valve disk.

Further, in accordance with the present invention, the seal members on the two valve disks are arranged so that the seal member in the first valve disk maintains a sealing action as the first valve disk moves toward the second valve disk until the first valve disk contacts the seal member on the second valve disk closing off the hollow leakage space.

With the valve construction embodying the present invention it can be assured, particularly in valves with valve disks of different dimensions, that no liquid leakage can escape while the first valve disk is being moved from the closed position toward the second valve disk. When the first valve disk contacts the second valve disk the sealing action is effected by the seal member mounted in the second valve disk. Losses of the liquid product, such as losses flowing from the leakage space to the outside of the valve, particularly in valves where they are switched between the open and closed positions frequently, are eliminated.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
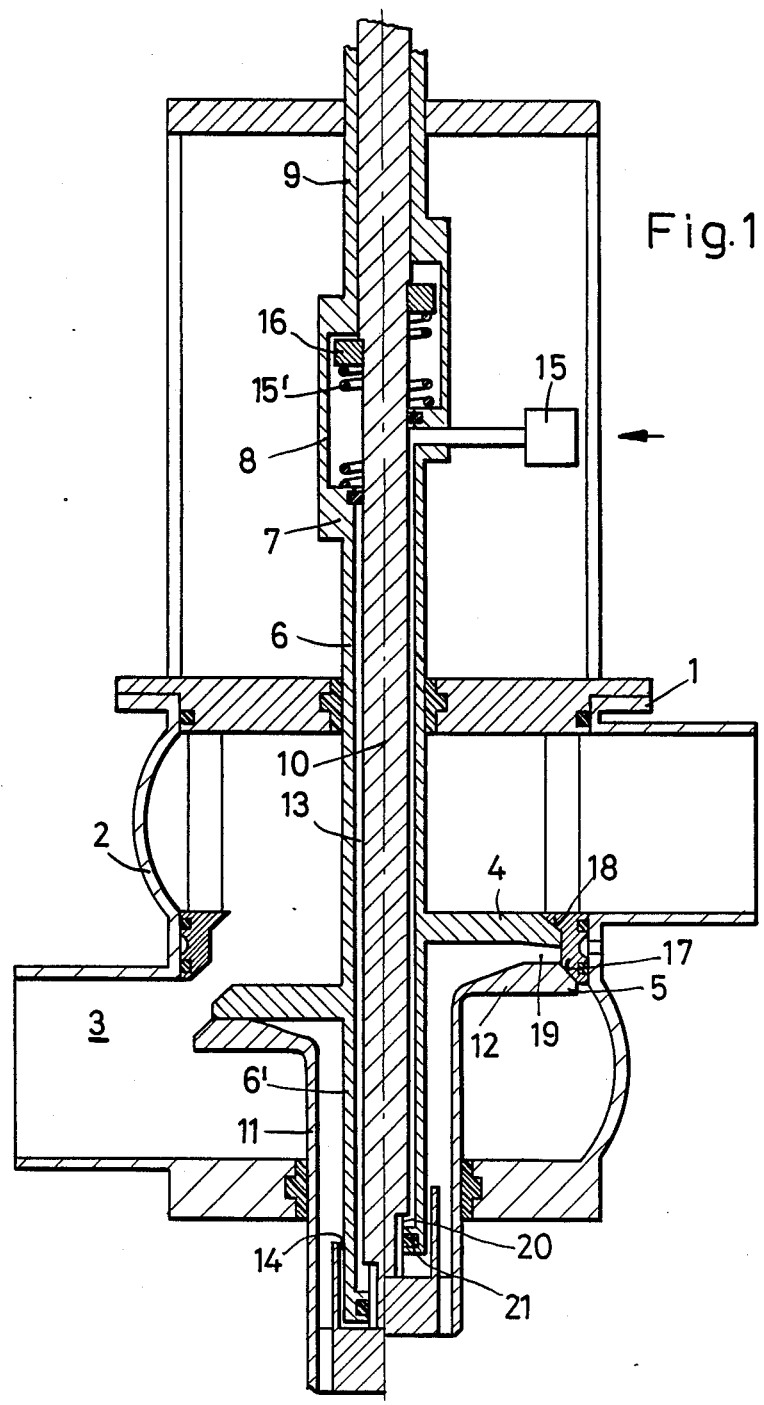
FIG. 1 is a sectional view through a double seat valve embodying the present invention.

In the drawing, particularly FIG. 1, a double seat valve is illustrated including a duplex housing 1 with spherically shaped housing chambers 2, 3. The housing is constructed as a multiple path distributor and has various connections for a liquid processing system. Two valve members 4, 5 are located within the duplex housing 1 and are movable independently of one another. As viewed in the drawing, valve member 4 is the upper valve member and valve member 5 is the lower valve member. Upper valve member 4 is connected to an upwardly extending hollow adjusting rod 6 for movement within the housing relative to a valve seat 18. Above the housing 1, the hollow rod 6 has an enlarged radially outwardly extending portion 7. A tube 8 extends upwardly from the portion 7 and has the same outside diameter. At its upper end, the tube is connected to a piston rod 9 and an adjusting device, not shown in the drawing. A solid adjusting rod 10 is supported within the hollow adjusting rod 6 and extends downwardly through the piston rod 9, the tube 8 and the enlarged portion 7 and also through the rod 6 into the housing and it is connected at its lower end to a leakage tube 11. The upper end of the leakage tube 11 is attached to the radially inner edge of the lower valve disk 12 of the lower valve member 5. As can be seen in FIG. 1, the radially outer diameter of the lower valve disk 12 is greater than the radially outer diameter of the upper valve disk of the valve member 4.

The outer surface of the solid adjusting rod 10 is spaced inwardly from the inner surface of the hollow adjusting rod 6 so that an annular gap 13 is formed between the two surfaces and the gap extends from the enlarged portion 7 down to the lower end of the adjusting rod 10. A discharge channel 14 extending upwardly from the lower end of the hollow adjusting rod 6 provides a flow passage for redirecting cleaning fluid from the lower end of the annular gap 13 upwardly into the leakage tube 11. In the region of the enlarged portion 7 a cleaning fluid connection 15 is provided into the annular gap 13 so that the cleaning fluid can flow downwardly through the gap to the lower end of the hollow adjusting rod 6 and then through the discharge channel 14 upwardly into the leakage tube 11. Within the tube 8 extending upwardly from the enlarged portion 7, there is a compression spring 15' with its lower end in contact with the enlarged portion and its upper end bearing against an annular web 16 secured around the surface of the inner adjusting rod 10. The compression spring 15' presses the lower and larger valve disk 12 against the valve seat 17 for the lower valve member 5 and when the upper valve member is displaced downwardly from its valve seat 18, the spring presses the lower valve disk against the upper valve disk.

When the hollow piston rod 9 is moved by means of the adjusting piston, not shown, it displaces the upper valve member 4 from its valve seat into contact with the lower valve member, which is biased upwardly by the compression spring 15, providing a hollow space between the two valve disks. As can be seen in FIG. 1, hollow space 19 is connected with the leakage tube 11 so that any liquid leaking into this space is directed downwardly and out of the valve housing. To clean this region including the hollow space 19 and the leakage tube 11, cleaning fluid is directed from the connection 15 through the annular gap 13 and the discharge channel 14 along the outside surface 6' of the hollow adjusting rod 6 until the cleaning fluid reaches the hollow space 19. From the hollow space 19, the cleaning fluid then flows along the inside wall surface of the leakage tube 11 downwardly out of the valve housing. When the valve is in the closed position or when the upper and lower valve members are in contact with their respective valve seats, the hollow space formed between their valve disks can also be flushed by the cleaning fluid.

In the region of the discharge channel 14, a shoulder 20 is located at the lower end of the adjusting rod 10 and an interior ring 21 of the hollow adjusting rod 6 cooperates with the shoulder 20. The purpose of this arrangement is to prevent the lower valve member 5 from remaining suspended in the open position. When the upper and lower valve members 4, 5 are moved from the open position upwardly into the closed position, the lower valve member is biased upwardly by the compression spring 15'. If the valve member 5 should become jammed, however, then the interior ring 21 rests against the shoulder 20 and disengages the lower valve member 5 from its jammed position so that it can be displaced into the closed position under the influence of the compression spring 15'.

Due to the location of the larger valve disk 12 of the lower valve member 5 beneath the smaller valve disk of the upper valve member 4, pressure shocks within the flow system containing the valve are transmitted to the housing 3 and can be intercepted without any damage, that is, any opening of the valve and mixture of the different liquids flowing through the two housing chambers 2, 3 is avoided. According to the embodiment shown in FIG. 2, the hollow space 19 located between the valve seats 17 and 18 is defined by a cylindrically shaped wall surface. This cylindrically shaped wall surface extends from the valve seat 18 for the upper valve disk or valve member 4 downwardly to the valve seat 17 for the lower valve disk of the lower valve member 5. A seal member 22 is located in and extends outwardly from the radially outer surface of the upper valve member 4 so that it contacts both the upper valve seat 18 and the cylindrically shaped wall surface extending downwardly from the upper valve seat. In the closed position of the upper valve member, the seal member 22 provides sealing contact with both the upper valve seat 18 and the cylindrically shaped wall surface. Accordingly, a seal is provided against any flow into the hollow leakage space 19 located between the upper and lower valve disks. As the upper valve member 4 is moved downwardly the seal member 22 moves out of sealing contact with the upper valve seat 18, however, it maintains its sealing contact with the cylindrically shaped wall surface between the upper and lower valve seats. This sealing contact with the cylindrically shaped wall surface is maintained until the upper valve disk or member 4 contacts the upper side of the lower valve member 5.

Figure 2:
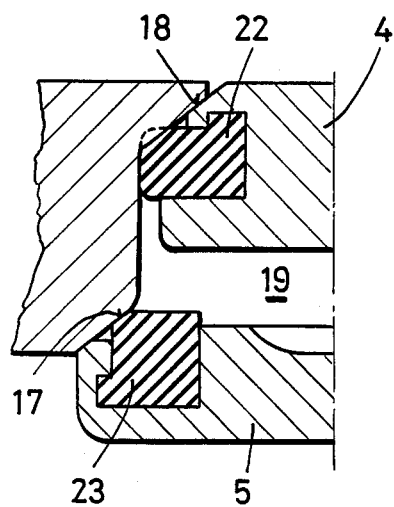
FIG. 2 is an enlarged detail view, according to the present invention, of the hollow leakage space located between the valve disks with a seal member in contact with the inner wall surface of the valve housing.

Preferably, as shown in FIG. 2, the lower valve member 5 has a seal member 23 which projects slightly upwardly from the upper surface of the lower valve disk 12 or lower valve member 5 and the seal member 23 provides sealing contact with the lower valve seats 17 with the closed position of the lower valve member 5. When the upper valve member 4 moves downwardly into contact with the lower valve member 5 its lower surface contacts the seal member 23 providing a sealing action into the leakage space 19. As the upper valve member 4 is moved downwardly toward the lower valve member 5 when the seal member 22 no longer contacts the cylindrically shaped inner surface between the upper and lower valve seats 18, 17, the hollow space 19 is sealed and liquid can flow out of the chamber 3 into the upper chamber 2 or in the reverse direction. Due to the sliding contact of the seal member 22 with the cylindrically shaped wall surface between the upper and lower valve seats 18, 17 it is assured, during the switching movement between the open and closed positions of the valve members, that the product being processed through the valve does not enter the leakage space 19 and flow out of the valve housing and become lost.

While specific embodiments of the invention have been shown and described in detail to illustrate the application of the inventive principles, it will be understood that the invention may be embodied otherwise without departing from such principles.

I claim:

1. Double seat valve comprising a housing having an axis extending therethrough, a first valve disk and a second valve disk located within said housing and extending transversely of the housing axis, a first valve seat within said housing for said first valve disk, a second valve seat within said housing for said second valve disk and spaced in the direction of the housing axis from said first valve seat, means for independently moving said first and second valve disks in the direction of said housing axis relative to the respective said first and second valve seats between a first position in contact with the respective said valve seats and a second position spaced from the respective said valve seats, said first and second valve disks forming the opposite sides of a hollow leakage space, means within said housing for conveying leakage from said leakage space to the exterior of said housing, wherein the improvement comprises a wall surface extending continuously around the interior of said housing and between said first and second valve seats and forming the radially outer boundary of said hollow leakage space in the first position of said first and second valve disks, a seal member mounted in said first valve disk and disposed in sealing engagement with said first valve seat and with said wall surface when said first valve disk is in the first position, said first valve disk moves from the first position to the second position in the direction toward the second valve disk in the first position and is movable into contact with said second valve disk, and during the movement of said first valve disk into contact with said second valve disk, said seal member in said first valve disk remains in sealing contact with said wall surface and maintains a seal for said hollow leakage space.

2. Double seat valve, as set forth in claim 1, wherein a second seal member is positioned in the surface of said second valve disk facing toward said first valve disk so that a seal is provided between said first and second valve disks when said first valve disk contacts said second valve disk as said first valve disk moves from the first position to the second position.

3. Double seat valve, as set forth in claim 1, wherein said wall surface extending between said first valve seat and said second valve seat is cylindrically shaped with said first valve seat extending at an acute angle radially inwardly from said cylindrically shaped wall surface and said second valve seat is arranged at an acute angle extending radially outwardly from said cylindrical wall surface.

4. Double seat valve, as set forth in claim 3, wherein said first valve disk has a smaller outside diameter than said second valve disk and in the first position said first valve seat prevents said first valve disk from moving in the direction away from said second valve disk.

5. Double seat valve, as set forth in claim 4, wherein said means for independently moving said first and second valve disks include a hollow rod connected to said first valve disk for moving said first valve disk toward and into contact with said second valve disk so that continued movement of said first valve disk displaces said second valve disk out of contact with said second valve seat.

6. Double seat valve, as set forth in claim 5, including spring means biasing said second valve disk in the direction toward said second valve seat so that said second valve disk is maintained in contact with said first valve disk when said first and second valve disks are in the second position.

7. Double seat valve, as set forth in claim 6, including means within said housing for releasing said second valve disk if said second valve disk becomes jammed in returning from the second position to the first position.

* * * * *